(12) United States Patent
Braylyan et al.

(10) Patent No.: US 9,943,043 B2
(45) Date of Patent: Apr. 17, 2018

(54) CULTIVATION DEVICE

(71) Applicants: David Braylyan, Cheshire, CT (US); Nicolai Boguslavschi, Chisinau (MD)

(72) Inventors: David Braylyan, Cheshire, CT (US); Nicolai Boguslavschi, Chisinau (MD)

( * ) Notice: Subject to any disclaimer, the term of this patent is extended or adjusted under 35 U.S.C. 154(b) by 90 days.

(21) Appl. No.: 14/819,423

(22) Filed: Aug. 5, 2015

(65) Prior Publication Data

US 2017/0006786 A1    Jan. 12, 2017

Related U.S. Application Data

(60) Provisional application No. 62/191,466, filed on Jul. 12, 2015.

(51) Int. Cl.
*A01G 9/12*      (2006.01)
*A01G 17/06*    (2006.01)
*A01G 29/00*    (2006.01)

(52) U.S. Cl.
CPC ............. *A01G 17/06* (2013.01); *A01G 29/00* (2013.01)

(58) Field of Classification Search
CPC ........ A01G 17/06; A01G 17/10; A01G 17/14; A01G 25/02
USPC ........................................ 47/42–47, 48.5, 79
See application file for complete search history.

(56) References Cited

U.S. PATENT DOCUMENTS

| | | | | |
|---|---|---|---|---|
| 2,990,647 A * | 7/1961 | Himebaugh | ............. | A01G 9/12 47/47 |
| 3,108,400 A * | 10/1963 | Wolfe, Jr. | ............. | A01G 27/008 137/856 |
| 3,188,771 A * | 6/1965 | Ballai | ............. | A01G 9/00 47/47 |
| 3,357,129 A * | 12/1967 | Torrence | ............. | A01G 27/006 47/47 |
| 3,875,699 A * | 4/1975 | Lamarre | ............. | A01G 25/00 138/115 |
| 4,021,965 A * | 5/1977 | Norris | ............. | A01G 29/00 239/58 |
| 4,153,380 A | 5/1979 | Hartman | | |
| 4,432,291 A | 2/1984 | Shirley | | |
| 4,677,788 A | 7/1987 | Mastandrea | | |
| 4,697,952 A | 10/1987 | Maddock | | |
| 4,745,706 A | 5/1988 | Muza et al. | | |
| 5,067,274 A | 11/1991 | Lewis | | |
| 5,099,602 A | 3/1992 | Arnold, Sr. et al. | | |
| 5,279,073 A | 1/1994 | Czebieniak | | |
| 5,341,593 A | 8/1994 | Foreman | | |
| 5,752,341 A * | 5/1998 | Goldfarb | ............. | A01G 9/124 47/47 |
| 6,000,172 A * | 12/1999 | Ballarino | ............. | A01G 17/06 47/47 |
| 6,039,267 A * | 3/2000 | Orsi | ............. | A01G 25/16 239/266 |

(Continued)

FOREIGN PATENT DOCUMENTS

FR      2733989 A1 *  11/1996  ............. A01G 17/14
FR      2775556 A1      9/1999

(Continued)

*Primary Examiner* — David J Parsley
*Assistant Examiner* — Danielle A Clerkley
(74) *Attorney, Agent, or Firm* — IRL Legal Services, LLC

(57) ABSTRACT

A device for cultivating liana plants for functioning as a trellis post and a part of the irrigation system.

8 Claims, 2 Drawing Sheets

(56) References Cited

U.S. PATENT DOCUMENTS

| | | | |
|---|---|---|---|
| 6,299,125 B1* | 10/2001 | Zayeratabat | A01G 29/00 248/218.4 |
| 6,378,245 B1 | 4/2002 | Summers | |
| 6,470,625 B1* | 10/2002 | Byun | A01G 9/023 47/82 |
| 6,843,022 B1* | 1/2005 | Holley | A47G 7/041 47/39 |
| 7,941,968 B1* | 5/2011 | Coyle | A01G 9/12 47/45 |
| 2006/0022066 A1* | 2/2006 | Jerstad | A01G 25/02 239/276 |
| 2007/0193114 A1* | 8/2007 | Kochling | A01G 29/00 47/48.5 |
| 2007/0289210 A1 | 12/2007 | Gray | |
| 2011/0247264 A1* | 10/2011 | Luciano, Jr. | A01G 13/065 47/2 |
| 2012/0159844 A1 | 6/2012 | Davis | |
| 2013/0160357 A1* | 6/2013 | Luciano, Jr. | A01G 13/065 47/2 |
| 2015/0251337 A1* | 9/2015 | Bidault | A01G 17/04 47/44 |
| 2016/0319566 A1* | 11/2016 | Carter | E04H 17/24 |

FOREIGN PATENT DOCUMENTS

| | | |
|---|---|---|
| JP | 2011182649 A | 9/2011 |
| RU | 2031571 C1 | 3/1995 |
| RU | 92004122 A | 6/1995 |
| RU | 2214088 C1 | 10/2003 |
| RU | 2223636 C2 | 2/2004 |
| RU | 2242870 C2 | 12/2004 |
| RU | 2421981 C1 | 6/2011 |
| RU | 2424655 C2 | 7/2011 |
| RU | 2475017 C1 | 2/2013 |
| RU | 2476065 C1 | 2/2013 |
| SU | 1194325 A1 | 11/1985 |

* cited by examiner

View A  B-B

CULTIVATION DEVICE

RELATED APPLICATIONS

This application claims the benefit under 35 USC 119(e) of U.S. Provisional Application No. 62/191,466, filed on Jul. 12, 2015, which is incorporated herein by reference in its entirety.

BACKGROUND OF THE INVENTION

A variety of liana plants (this term is used here to include lianas, vines, and other climbing plants) are cultivated. Such plants include some fruit trees, such as palmette fruit trees, grapevines, and various vegetables, such as eggplant, tomato, cucumber, squash, etc.

Normal development of a vine plant requires a support for its entire upper portion above the ground. A trellis (another possible term is espalier) is one of the best supports for this purpose. The branches supported by a trellis are attached reliably, are well illuminated by the sun, and get sufficient ventilation. For multi-trunk fan-shaped plants with more than 4 trunks it is reasonable to use double curtain trellises, including inclined trellises; such trellises allow maximum utilization of the sun's energy.

Such trellises simplify agro-technical activities over the entire vegetation season.

The known trellis designs are rather metal-intensive and require significant capital investments. The double-curtain trellises are sufficiently more expensive than single-curtain trellises and are less frequent than single-curtain trellises despite their agro-technical advantages.

One of the key agro-technical activities is prompt irrigation. The sprinkling irrigation is unreasonably water-intensive. The drip irrigation significantly reduces water consumption but it is more expensive to set up than sprinkling. Both irrigation methods, by irrigating the surface of the soil facilitate weed growth and formation of a surface crust on the soil. These factors sharply increase the amount of labor required for cultivating plants because they require frequent weeding and tilling of soil.

Subsurface irrigation reduces the water consumption even compared with drip irrigation because it eliminates water loss by surface evaporation. Subsurface irrigation also significantly reduces the amount of labor required for cultivating plants by reducing the required frequency of weeding and tilling.

The known subsurface irrigation devices are rather capital-intensive. Many of them are practically impossible to repair. Their pores are rather soon clogged with particles from the irrigating water and also by peripheral roots of the plants.

SUMMARY OF THE INVENTION

An example embodiment comprises: a tubular post inserted into the soil down to the between the middle and the full depth of the root zone; traverses mounted on the post to hold support wires; and a water distribution system; wherein the post, the traverses, and an endcap are preferably, but not exclusively, made of a polymer-mineral composite comprising, by mass: binder (secondary polyolefins in any proportion or secondary polyvinylchloride) from 15% to 30%; filler (milled byproducts of stone crushing or stone cutting of igneous or sedimentary rock belonging to the 0.05-1.00 mm fraction, sand) from 70% to 85%.

In some embodiments the post, the traverses, and an endcap are preferably, but not exclusively, made of a polymer-cellulose composite comprising, by mass: binder (secondary polyolefins in any proportion or secondary polyvinylchloride) from 15% to 30%; filler (powder generated by milling saw dust, woodchips, waste products of furniture manufacturing and wood processing, stalks of cereal plants, and similar recyclable materials) from 70% to 85%.

In some embodiments the post is partly filled with a layer of washed sand with a fineness modulus M of at least 2.5, with a thickness T between $5 \cdot D$ and $8 \cdot D$; and a macro-porous filter made, for example, of macro-porous high-strength LECA concrete using LECA particles of the 5 to 10 mm fraction, with thickness B between $0.1 \cdot D$ and $0.25 \cdot D$; wherein D is an internal diameter of the post.

In some embodiments the endcap is positioned on the post, wherein the endcap comprises an inlet and an outlet nozzle and partitions between them preventing direct flow of water from one nozzle into another until the post is filled with water, In some embodiments the upper part of the endcap comprises a cradle for a wire, on which watering hoses are hanging.

In some embodiments the endcap and the traverses comprise a mounting conical opening, which matches in axial and radial direction an external cone of an elastomer ring, mounted with a certain tension on the post at required locations.

In some embodiments the traverses for holding the support wires can be made of different lengths and mounted on the post with lengths decreasing from top to bottom.

In some embodiments a vegetable garden die construction uses an adapter unified at its greater diameter with a post of a grapevine trellis, functioning to mount a unified endcap and to increase the volume of liquid in the trellis under manual filling.

Some embodiments are devices inserted into soil one foot deeper than the depth of planting of corresponding nursery plants.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
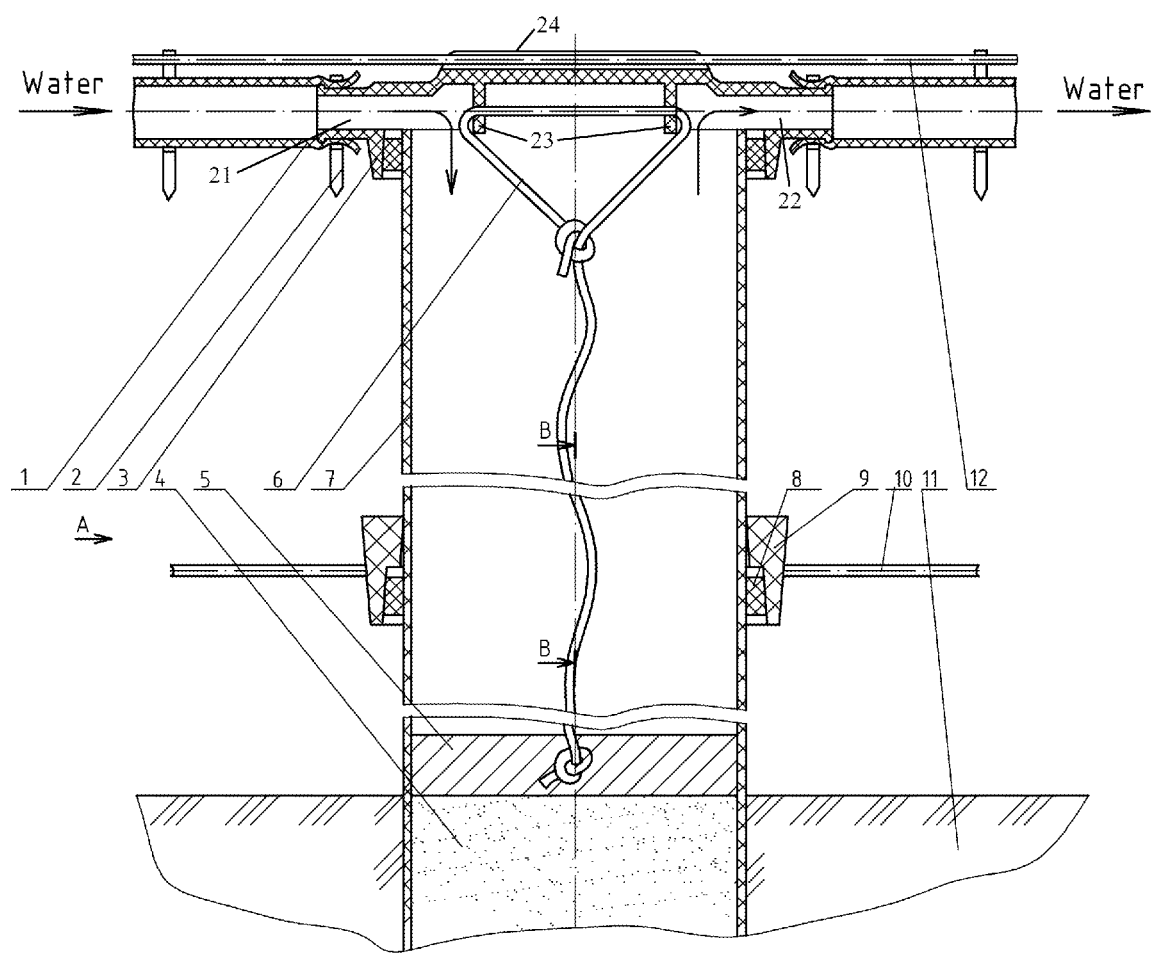
FIG. 1 shows a grapevine trellis. View A is to the left of the central axis. View B is to the right of the central axis.
Figure 1:
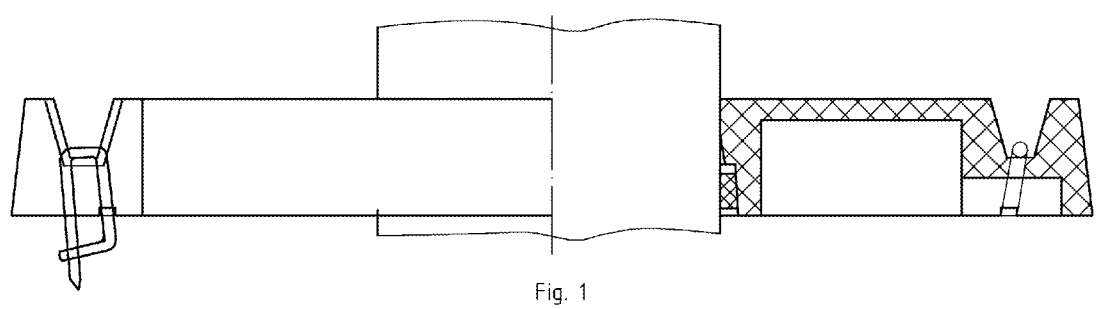

Disclosed is an eco-friendly device for cultivating annual and perennial liana plants.

The purpose of the present invention is to provide devices for cultivating liana plants, supporting the plants and delivering required amount of water and fertilizer to the plant roots. These devices do not have the disadvantages of the known devices and methods used for the same purpose.

One device according to the invention comprises a tubular post made of a polymer-mineral composite or polymer-cellulose composite material. The height of the post, its diameter, and its wall's thickness are chosen in accordance with its task.

For example, the post for palmette gardens and for grapevine may be made of a tube 80 mm to 100 mm in diameter, with the wall thickness of 4 mm to 6 mm. The length of such a post is about 2400 mm. This post is sitting in the ground 600 mm deep.

For example, the post for vegetable plants may be made of a tube 30 mm to 40 mm in diameter, with the wall thickness of 2 mm to 4 mm. The length of such a post is about 1800 mm. This post is sitting in the ground 300 mm deep.

The lower part of the post is filled with soil, which enters it when the post is pressed into the ground. Above the layer of soil in the post there is a layer of sand introduced into the post after the post is pressed into the ground. The washed sand with a fineness modulus M of at least 2.5 is preferable.

The thickness of the sand layer T is between 5 D and 8 D, where D is the internal diameter of the post.

The sand layer reduces the water pressure and ensures delivery of water into soil only via capillary suction, the amount of water delivered this way is equal to the amount of water consumed by the plant. This also solves the problem of soil aeration because the water delivered this way fills only the capillaries in the soil while larger pores in the soil remain dry and filled with air.

A macro-porous filter is placed on the surface of the sad layer to prevent agitation of the sand when the trellis is filled with water and contamination of the sand with small solid particles suspended in the irrigation water. The thickness of the filter B is between 0.1 D and 0.25 D. In practice this thickness is about 20 mm.

A preferable material for its manufacturing is high-strength concrete or LECA concrete with filler particles of the 5 to 10 mm fraction. In macro-porous high-strength LECA concrete the amount of the concrete-sand mix is sufficient only to cover the large filler particles with a thin layer, in this case not thicker than 1-2 mm. The filter is periodically removed and washed. Usually it is required not more than once each season. The filter and the sand prevent caking of the soil in the lower part of the post when water supply is interrupted.

The upper part of the post is hermetically covered with an endcap with an inlet nozzle and an outlet nozzle. The nozzles of adjacent posts in a row are connected with segments of an irrigation hose attached to the nozzles with a cable tie. The upper part of the endcap has a cradle holding the wire on which the watering hose is hanging attached with the same cable ties. Inside the endcap, deflectors prevent free flow of water from the inlet nozzle into the outlet nozzle before the post is filled with water. This water delivery setup prevents formation of air gaps in the post.

The endcap is preferably manufactured with the same composite material as the post.

On the post, at required location, traverses are mounted to hold the support wires. A grapevine trellis is supplied with galvanized high-strength wire, normally 2.5 mm in diameter. For easy mounting of wires the traverses have slots with openings on top. After the wire is placed into slots and is tightened, the wire is fixated on the traverse with a cable tie without tightening it too much.

A vegetable trellis, which carries significantly lower loads, is supplied with wires, for example, made of polypropylene strings.

The traverses for both the vegetable and grapevine trellises are made of the same material as the post.

The post is made by extrusion molding, the endcap—by pressure casting, and traverses—by pressing or by vibration molding.

Both the endcap and the traverses are fixed on the post using an weather-proof elastomer ring with cylindrical internal surface sitting on the post with slight tension. The external surface of the ring is conical with an angle between 3° and 7°. The ring is positioned on the post with the smaller diameter on top.

Both the endcap and the traverses comprise in their lower portion a mounting surface with the same conical shape as the ring. The mounting plane connects with the opening with the diameter greater than the external diameter of the post by 0.1-1.0 mm.

When a endcap or a travers is mounted on a ring, it becomes compressed and very reliably holds it on the post. This setup allows during the growth of the plant, instead of changing ties, to move the traverse upwards with its subsequent fixation at a new level.

A vegetable trellis further includes an adapter manufactured by pressure molding using the same composite material as the other parts of the trellis. The external diameter of the adapter is the same as the external diameter of the post in a grapevine trellis. This allows uniformity of the endcaps for variety of trellises. Also, the adapter simplifies manual filling of a post with water when the trellis is used in plots near residences, where setting up a centralized water delivery system would be unreasonable. In such case, by increasing the internal volume of the trellis, the adapter permits filling it at most two or three times a month. The practice shows that it is useful to alternate using water with using water combined with a fertilizer.

All parts of the device except for the rings, wires and strings, are preferably, but not exclusively, made of a polymer-mineral composite comprising, by mass: binder (secondary polyolefins in any proportion or secondary polyvinylchloride) from 15% to 30%; and filler (milled byproducts of stone crushing or stone cutting of igneous or sedimentary rock belonging to the 0.05-1.00 mm fraction, quartz sand) from 70% to 85%.

When using a polymer-cellulose composite the same binder is used, but the filler is powder generated by milling saw dust, woodchips, waste products of furniture manufacturing and wood processing, stalks of cereal plants, and similar cellulose recyclable materials.

When setting up a new plot, the trellises are pressed into the soil at depth greater than the depth of the planted trees by about a foot. The depth for a garden trellis or a grapevine trellis is two feet, for a vegetable trellis—one foot.

This provides sufficiently firm installation of the post in the soil combined with roots growing downward. The increased depth of the root zone improves the internal soil water saturation, improves the robustness of the root system and prevents moistening of the surface layer of the soil.

Therefore, a device according to the invention, is an eco-friendly device significantly more feasible economically than it would be if primary raw materials were used.

The test trials for accelerated wear conducted on a Ksenotest installation have shown that both the polymer-mineral and the polymer-cellulose composite materials are highly resistant to compression and bend and have a long lifetime when used in open air. The testing was stopped at the level corresponding to 30 years of use on open air; neither the external appearance nor mechanical properties of the samples have changed.

FIG. 1 shows a grapevine trellis, where:

1—watering hose; 2—cable tie; 3—endcap; 4—sand layer; 5—filter; 6—flexible filter rope made, for example, of a polypropylene string; 7—post; 8—ring; 9—traverse; 10—support wire for grape shoots; 11—soil; 12—wire supporting a watering hose; 21—inlet watering hose nozzle for delivering water into the post; 22—outlet watering hose nozzle for running water from the device; 23—partition; 24—cradle.

Figure 2:
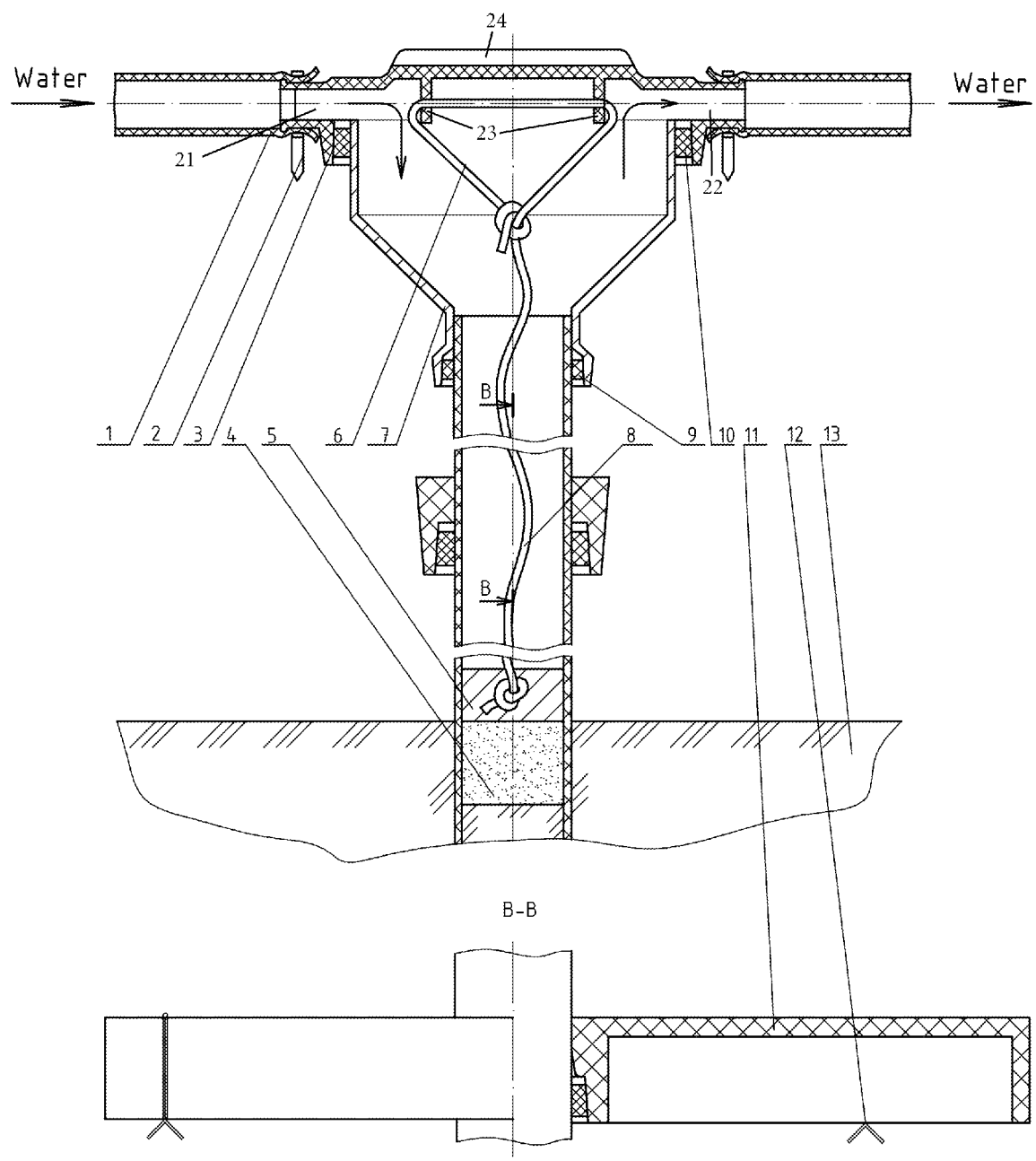
FIG. 2 shows a vegetable trellis.

FIG. 2 shows a vegetable trellis, where:

1—watering hose; 2—cable tie; 3—endcap; 4—sand layer; 5—filter; 6—flexible filter rope; 7—adapter; 6—post; 9—ring; 10—ring; 11—traverse; 12—support wire for vegetable shoots; 13—soil; 21—inlet watering hose nozzle for delivering water into the post; 22—outlet watering hose nozzle for running water from the device; 23—partition; 24—cradle.

Experimental testing at a vegetable plot has shown that the present device when used for cultivating tomatoes and eggplant allows a seven-fold decrease of water consumption compared with surface irrigation used as a control, at the same time the harvest was 50% greater both for eggplants and tomatoes.

The comparison of development of the root system of tomato plants with subsurface an surface irrigation shows absence of blockage of the watering end of the gardening trellis with roots. There was no need to do any tilling or weeding, while on the control plot with surface irrigation these measures had to be taken at least two times a month.

Therefore, the disclosed device: minimizes capital costs for acquisition of these devices; minimizes maintenance costs for trellis repairs; increases plant harvest; provides plants with the necessary amount of water with dissolved fertilizer delivered directly into the root zone; eliminated waste of water and energy for its delivery; eliminates labor costs for weeding and tilling; eliminated removal of the soil nutrients be weeds; provides optimal insulation and ventilation of the plants; optimizes cultivation while decreasing capital and maintenance costs.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A device for cultivating liana plants, the device comprising:

a tubular post inserted into soil;

traverses mounted on the post capable of holding support wires;

and a water distribution system comprising an endcap;

wherein the endcap is positioned on the post; and wherein the endcap comprises:

an inlet watering hose nozzle for delivering water into the post, an outlet watering hose nozzle for running water from the device, and a partition between the nozzles, positioned within the endcap;

wherein the partition is configured to prevent flow of water from the inlet nozzle into the outlet nozzle unless the post is filled with water.

2. The device of claim 1, wherein the post, the traverses, or the endcap are made of a polymer-cellulose composite comprising, by mass:

binder, comprising secondary polyolefins or secondary polyvinylchloride, from 15% to 30%;

filler, comprising powder generated by milling saw dust, woodchips, waste products of furniture manufacturing and wood processing, stalks of cereal plants, and similar recyclable materials, from 70% to 85%.

3. The device of claim 1, further comprising a macro-porous filter positioned within the post, wherein the post is partly filled with a layer of washed sand with a fineness modulus M of at least 2.5, with a thickness T between 5×D and 8×D; and wherein the macro-porous filter is made of macro-porous high-strength LECA concrete using LECA particles of the 5 to 10 mm fraction, with thickness B between 0.1×D and 0.25×D; wherein D is an internal diameter of the post.

4. The device of claim 1, wherein an upper part of the endcap comprises a cradle for a wire capable of supporting hanging watering hoses.

5. The device of claim 1, wherein the endcap and the traverses are mounted on the post with elastomer rings, the rings being mounted with tension on the post.

6. The device of claim 1, wherein lengths of the traverses decrease from top to bottom.

7. The device of claim 1, wherein the internal diameter of the endcap is greater than the external diameter of a top end of the post, and wherein the endcap is mounted on the post with a conical adapter.

8. The device of claim 1 wherein the post, the traverses, or the endcap are made of a polymer-mineral composite comprising, by mass:

binder, comprising secondary polyolefins, from 0% to 100%, or secondary polyvinylchloride, from 15% to 30%;

filler, comprising milled byproducts of stone crushing or stone cutting of igneous or sedimentary rock belonging to the 0.05-1.00 mm fraction sand, from 70% to 85%.

* * * * *